(12) United States Patent
Sugiki et al.

(10) Patent No.: US 8,976,485 B1
(45) Date of Patent: Mar. 10, 2015

(54) ROTATING DEVICE

(71) Applicant: Samsung Electro-Mechanics Japan Advanced Tech. Co. Ltd., Fujieda, Shizuoka Prefecture (JP)

(72) Inventors: Ryusuke Sugiki, Fujieda (JP);
Motoyuki Sugiura, Fujieda (JP);
Futoshi Yoshimatsu, Fujieda (JP);
Satoshi Hatahara, Fujieda (JP);
Shunsuke Takagaki, Fujieda (JP)

(73) Assignee: Samsung Electro-Mechanics Japan Advanced Technology Co., Ltd., Fujieda (JP)

( * ) Notice: Subject to any disclaimer, the term of this patent is extended or adjusted under 35 U.S.C. 154(b) by 0 days.

(21) Appl. No.: 14/467,309

(22) Filed: Aug. 25, 2014

(30) Foreign Application Priority Data

Aug. 28, 2013 (JP) ................................. 2013-177210
Oct. 20, 2013 (JP) ................................. 2013-225676

(51) Int. Cl.
*G11B 17/02* (2006.01)
*G11B 33/14* (2006.01)
*F04D 17/08* (2006.01)
*F04D 29/057* (2006.01)

(52) U.S. Cl.
CPC ............ *G11B 33/1486* (2013.01); *F04D 17/08* (2013.01); *F04D 29/057* (2013.01)
USPC ........................................ 360/99.02; 360/88

(58) Field of Classification Search
USPC ...................................... 360/88, 99.02, 99.08
See application file for complete search history.

(56) References Cited

U.S. PATENT DOCUMENTS

| 7,379,267 | B2 * | 5/2008 | Engesser et al. | 360/99.12 |
|---|---|---|---|---|
| 8,358,484 | B2 * | 1/2013 | Nagai et al. | 360/99.12 |
| 8,437,101 | B1 * | 5/2013 | German et al. | 360/99.12 |
| 8,510,931 | B2 * | 8/2013 | Slezak | 29/603.03 |
| 8,599,516 | B2 | 12/2013 | Nishitani | |
| 8,683,677 | B2 * | 4/2014 | Alisantoso et al. | 29/603.03 |
| 8,717,706 | B1 * | 5/2014 | German et al. | 360/99.12 |
| 8,755,148 | B1 * | 6/2014 | Howie et al. | 360/99.12 |

FOREIGN PATENT DOCUMENTS

JP    2011103150 A    5/2011

\* cited by examiner

*Primary Examiner* — Allen T Cao
(74) *Attorney, Agent, or Firm* — Holtz, Holtz, Goodman & Chick PC

(57) ABSTRACT

A rotating device includes a retained assembly including a spherical retained member with a spherical encircled face, and an encircling member that includes an annular end face which encircles the spherical retained member and which extends outwardly in a radial direction, a retainer assembly including a retainer member which includes an encircling face encircling the encircled face and which retains thereinside a part of the spherical retained member, and a facing member that faces the encircling member in an axial direction, the retainer assembly supporting the retained assembly in a freely and relatively rotatable manner, and forming a fluid dynamic bearing mechanism, and a thrust dynamic pressure generating groove formed in at least either one of a surface of the encircling member and a surface of the facing member, which surfaces face with each other in the axial direction.

20 Claims, 14 Drawing Sheets

100

ROTATING DEVICE

BACKGROUND OF THE INVENTION

1. Field of the Invention

The present disclosure relates to a rotating device, such as a disk drive device that rotates and drives recording disks, and a fan motor that rotates to produce wind.

2. Description of the Related Art

Disk drive devices like hard disk drives are becoming compact and increasing the storage capacity, and are built in various electric devices. In particular, disk drive devices are nowadays built in portable electric devices, such as a laptop computer, a tablet terminal, and a portable music player.

For example, JP 2011-103150 A discloses a disk drive device that employs a fluid dynamic bearing mechanism as a bearing.

There is a demand of a further thinning for disk drive devices including one disclosed in JP 2011-103150A. When, however, disk drive devices are made thin, an axial span of the radial dynamic bearing part in the fluid dynamic bearing becomes small, and thus the bearing rigidity may be reduced. When the bearing rigidity decreases, a tilting of a rotation shaft of a rotating body when off-center load is applied thereto may become large, and in the worst case, the rotating body contacts a stationary body, which is cause of breakdown. Hence, in order to compensate the reduction of the rigidity of the radial dynamic bearing part due to thinning, a thrust radial dynamic bearing part is provided at a relatively distant location from the rotation center, and the bearing rigidity of the thrust dynamic bearing part should be enhanced.

Such a technical problem is also common to other kinds of rotating devices and is not particular to disk drive devices.

The present disclosure has been made in view of the aforementioned circumstances, and it is an objective of the present disclosure to provide a rotating device that enhances the bearing rigidity of a thrust dynamic bearing part, thus advantageous for thinning.

SUMMARY OF THE INVENTION

To accomplish the above objective, a rotating device according to a first aspect of the present disclosure includes: a retained assembly including a spherical retained member with a spherical encircled face, and a first encircling member that includes an annular end face which encircles the spherical retained member and which extends outwardly in a radial direction; a retainer assembly including a retainer member which includes an encircling face encircling the encircled face and which retains thereinside a part of the spherical retained member, and a facing member that faces the first encircling member in an axial direction, the retainer assembly supporting the retained assembly in a freely and relatively rotatable manner, and forming a fluid dynamic bearing mechanism; and a first thrust dynamic pressure generating groove formed in at least either one of a surface of the first encircling member and a surface of the facing member, which surfaces face with each other in the axial direction.

To accomplish the above objective, a rotating device according to a second aspect of the present disclosure includes: a retained assembly including a retained member in a truncated cone shape having a tapered encircled face, and a first encircling member that includes an annular end face which encircles the truncated conical retained member and which extends outwardly in a radial direction; a retainer assembly including a retainer member which includes an encircling face encircling the encircled face and which retains thereinside apart of the truncated conical retained member, and a facing member that faces the first encircling member in an axial direction, the retainer assembly supporting the retained assembly in a freely and relatively rotatable manner, and forming a fluid dynamic bearing mechanism; and a first thrust dynamic pressure generating groove formed in at least either one of a surface of the first encircling member and a surface of the facing member, which surfaces face with each other in the axial direction.

To accomplish the above objective, a rotating device according to a third aspect of the present disclosure includes: a retained assembly including a retained member that has a spherical or tapered encircled face, and an encircling member that includes an annular end face which encircles the retained member and which extends outwardly in a radial direction; a retainer assembly including a retainer member which includes an encircling face encircling the encircled face and which retains thereinside a part of the retained member, and a facing member that faces the encircling member in an axial direction, the retainer assembly supporting the retained assembly in a freely and relatively rotatable manner, and forming a fluid dynamic bearing mechanism; a thrust dynamic pressure generating groove formed in at least either one of a surface of the encircling member and a surface of the facing member, which surfaces face with each other in the axial direction; a rotating body which is supported by the fluid dynamic bearing mechanism and which is fixed with a vane that creates wind when rotated; and a drive mechanism that rotates the rotating body.

Arbitrary combinations of the aforementioned structural elements and mutual replacement of the structural elements and expressions of the present disclosure among a method, a device, and a system are also effective as an embodiment of the present disclosure.

DETAILED DESCRIPTION OF THE PREFERRED EMBODIMENTS

Figure 1A:
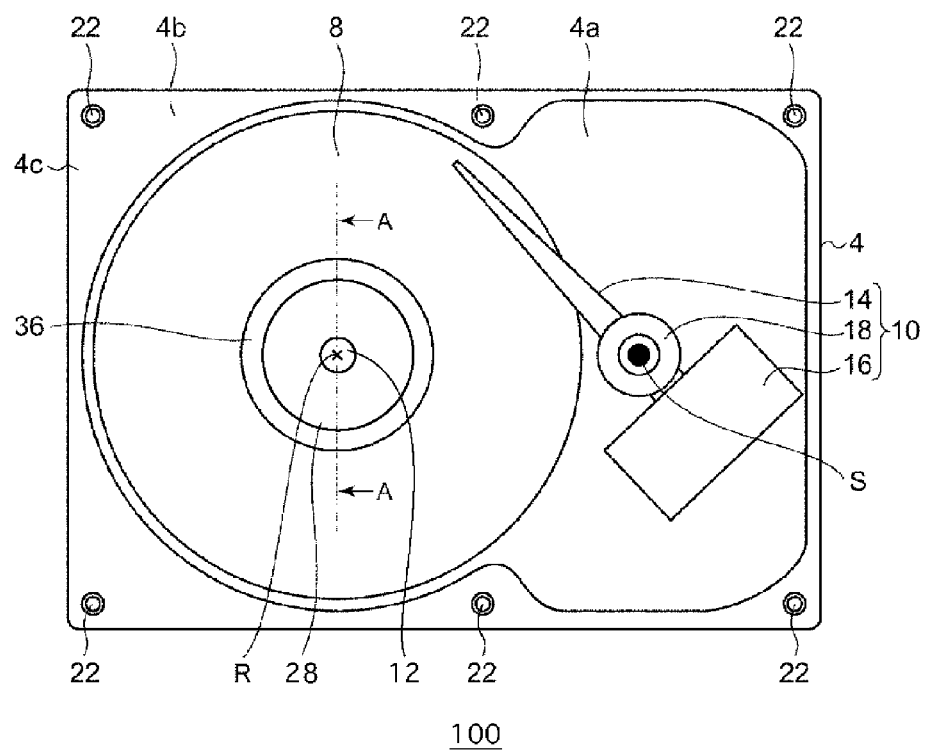
FIGS. 1A and 1B are a top view and a side view illustrating a rotating device according to a first embodiment.

The same or corresponding structure, and component in respective figures will be denoted by the same reference numeral, and the duplicated explanation thereof will be omitted accordingly. The dimension of a component in each figure is enlarged or scaled down as needed to facilitate understanding. Apart of a component not important to explain an embodiment will be omitted in each figure.

A rotating device according to an embodiment is suitably utilized as a disk drive device, in particular, a hard disk drive loaded with a magnetic recording disk and rotating and driving such a recording disk, and a fan motor that rotates to produce wind.

First Embodiment

Figure 1B:

FIGS. 1A and 1B illustrate a rotating device 100 according to a first embodiment. FIG. 1A is a top view of the rotating device 100. FIG. 1B is a side view of the rotating device 100. In FIG. 1A, a top cover 2 is detached to illustrate the internal structure of the rotating device 100. The rotating device 100 includes a stationary body, a rotating body that rotates relative to the stationary body, a magnetic recording disk 8 to be mounted on the rotating body, and a data reader/writer 10. The stationary body includes a base 4, the top cover 2, and six screws 20. The rotating body includes a hub 28, a clamper 36, and a cap 12.

In the following explanation, a side at which the hub 28 is mounted relative to the base 4 will be defined as an upper side.

The magnetic recording disk 8 is, for example, a 2.5-inch magnetic recording disk formed of glass, and having a diameter of 65 mm. The diameter of a center hole is 20 mm, and the thickness is 0.65 mm. The magnetic recording disk 8 is to be mounted on the hub 28, and is rotated together with a rotation of the hub 28.

The base 4 is formed and shaped by, for example, die-casting of an aluminum alloy. The base 4 includes a bottom portion 4a forming the bottom of the rotating device 100, and an outer circumference wall 4b formed along the outer circumference of the bottom portion 4a so as to encircle an area where the magnetic recording disk 8 is placed. Six screw holes 22 are provided in an upper face 4c of the outer circumference wall 4b. The base 4 may be formed by pressing of a steel sheet or an aluminum sheet. In this case, the base 4 may include an embossed portion such that one surface of the base 4 may be raised to form a convexity, and another surface may be formed with a concavity corresponding to that convexity. By providing an embossed portion at a predetermined location, a deformation of the base 4 can be suppressed. In addition, the base 4 may be a combination of a sheet-metal portion formed by pressing and a die-cast portion formed and shaped by aluminum die-casting.

A surface coating is applied to the base 4 in order to suppress a peeling from the surface thereof. An example surface coating applied is a resin-material coating like an epoxy resin. Alternatively, a surface coating may be a coating formed by plating a metal material, such as nickel or chrome. In this embodiment, the base 4 has the surface having undergone electroless nickel plating. In comparison with a case in which the resin material is applied as a coating, the surface hardness is enhanced to decrease a friction coefficient. Hence, when, for example, the magnetic recording disk 8 contacts the surface of the base 4 at the time of manufacturing, the possibility that the surface of the base 4 and the magnetic recording disk 8 are damaged can be reduced. In this embodiment, the surface of the base 4 has a static friction coefficient within a range from 0.1 to 0.6. In comparison with a case in which the static friction coefficient is equal to or greater than 2, the possibility that the base 4 and the magnetic recording disk 8 are damaged can be further reduced.

The data reader/writer 10 includes an unillustrated recording/playing head, a swing arm 14, a voice coil motor 16, and a pivot assembly 18. The recoding/playing head is attached to the tip of the swing arm 14, records data in the magnetic recording disk 8, or reads the data therefrom. The pivot assembly 18 supports the swing arm 14 in a swingable manner to the base 4 around a head rotating axis S. The voice coil motor 16 allows the swing arm 14 to swing around the head rotating axis S to move the recording/playing head to a desired location over the top face of the magnetic recording disk 8. The voice coil motor 16 and the pivot assembly 18 are configured by a conventionally well-known technology of controlling the position of a head.

The top cover 2 is fastened to the upper face 4c of the outer circumference wall 4b of the base 4 using six screws 20. The six screws 20 correspond to the six screw holes 22. In particular, the top cover 2 and the upper face 4c of the outer circumference wall 4b are fastened together in such a way that no leak to the interior of the rotating device 100 occurs from the joined portion therebetween.

Figure 2:
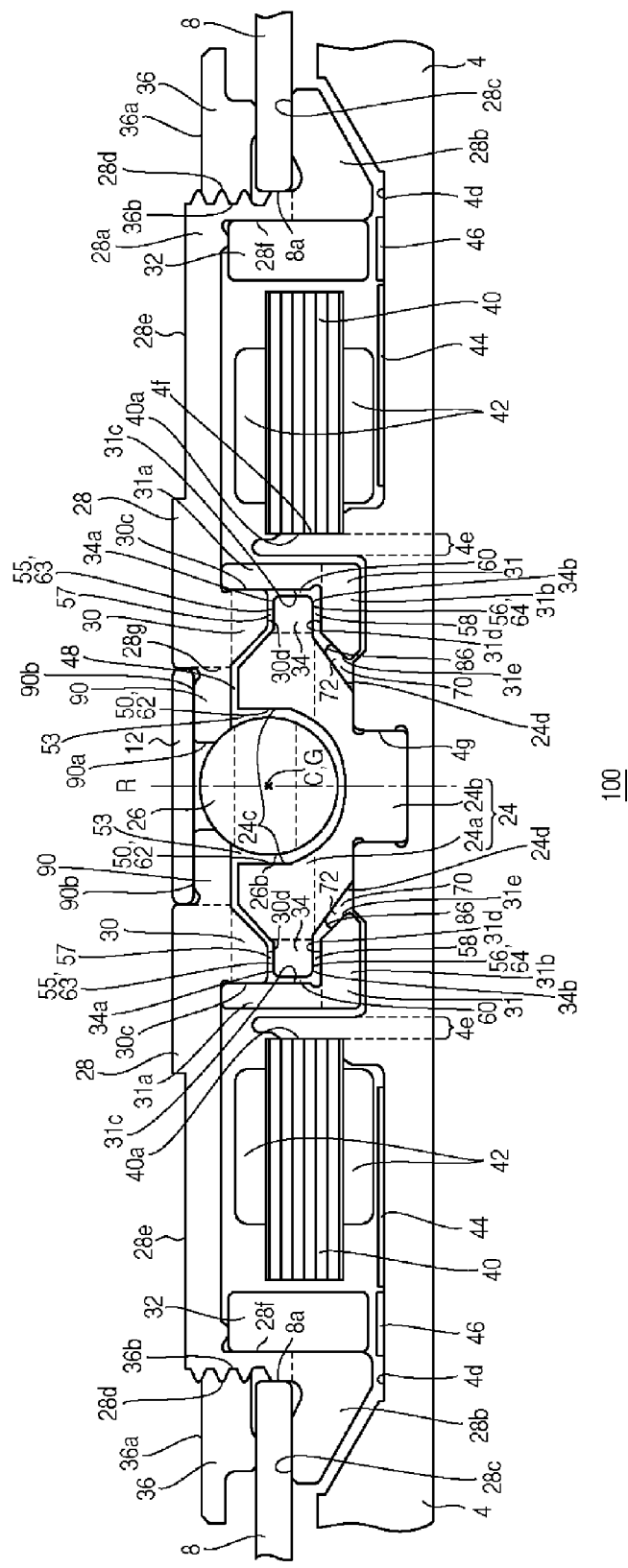
FIG. 2 is a cross-sectional view taken along a line A-A in FIG. 1A.

FIG. 2 is a cross-sectional view taken along a line A-A in FIG. 1A.

The rotating body includes the hub 28, a retained member 26, a retained-member holder 90, a first thrust member 30, a second thrust member 31, the clamper 36, a cylindrical magnet 32, and the cap 12. The stationary body includes the base 4, a retainer member 24, a flange member 34, a stator core 40, coils 42, an insulation tape 44, and an attracting plate 46. A lubricant 48 is continuously applied in a part of gaps between the rotating body and the stationary body.

The hub 28 is formed by, for example, cutting and machining or pressing a ferrous material with a soft magnetism like SUS 430 or SUS 303, and is formed in a predetermined shape like a substantially cup shape. In order to suppress a peeling from the surface of the hub 28, a surface layer forming process like electroless nickel plating may be applied to the surface of the hub 28.

The hub 28 includes a hub protrusion 28a to be engaged with the center hole 8a of the magnetic recording disk 8, and a mount portion 28b provided outwardly in the radial direction relative to the hub protrusion 28a. The magnetic recording disk 8 is to be mounted on a disk mount face 28c that is the upper face of the mount portion 28b. The magnetic recording disk 8 is held between the clamper 36 and the mount portion 28b, thereby being fastened to the hub 28.

The clamper 36 applies downward force in the axial direction to the upper face of the magnetic recording disk 8 to cause the magnetic recording disk 8 to be in contact with the disk mount face 28c with pressure. The clamper 36 is engaged with an outer circumference 28d of the hub protrusion 28a. The clamper 36 and the outer circumference 28d of the hub protrusion 28a can be joined together by mechanical joining techniques, such as screwing, caulking, and press-fitting, or a magnetic joining technique utilizing magnetic suction force.

The clamper 36 is disposed in such a way that, with the clamper 36 applying desired downward force to the magnetic recording disk 8, an upper face 36a of the clamper 36 does not protrude upwardly beyond an upper face 28e of the hub protrusion 28a.

When, for example, a structure is employed in which the clamper 36 and the outer circumference 28d of the hub protrusion 28a are engaged by screwing, a male screw is formed on the outer circumference 28d of the hub protrusion 28a, while a counterpart female screw is formed in an inner circumference 36b of the clamper 36. In this case, depending on the strength of the screwing, the tension of the downward force applied by the clamper 36 to the upper face of the magnetic recording disk 8 can be relatively precisely adjusted. The clamper 36 may be formed of multiple pieces, or may be a single piece.

If process burrs are sticking to the outer circumference 28d of the hub protrusion 28a, when the clamper 36 is engaged with the outer circumference 28d by screwing, the clamper 36 may contact the process burrs and the process burrs are peeled. In order to eliminate such process burrs in advance, a burr eliminating process may be applied to the outer circumference 28d of the hub protrusion 28a.

The first thrust member 30 is provided on the lower face of the hub protrusion 28a so as to encircle the retainer member 24. The first thrust member 30 is formed in an annular shape, and is formed of a metal, such as a ferrous material like SUS 430 or SUS 303, or a copper alloy. The first thrust member 30 is formed integrally with the hub 28. The first thrust member 30 and the hub 28 may be formed separately, and then joined with each other.

The retained-member holder 90 is provided at an inner-circumference-28g side of the hub protrusion 28a. The retained-member holder 90 is formed in an annular shape, and is formed of a metal, such as a ferrous material like SUS 430 or SUS 303, or a copper alloy. The retained-member holder 90 is formed with a hole 90a provided coaxially with a rotation axis R of the rotating body. The retained-member holder 90 is formed integrally with the hub 28. The retained-member holder 90 may be formed separately from the hub 28, and then joined with each other.

As an example, the retained member 26 is formed of a ferrous material like SUJ2 or ceramics. The retained member 26 is formed in a solid shape obtained by rotating, around the rotation axis R, a plane having the rotation axis R of the rotating body as a side. In this embodiment, the retained member 26 is formed as a solid obtained by rotating, around the rotation axis R, a semi circle having the rotation axis R as a diameter. That is, the retained member 26 is formed in a spherical shape. Hence, aside face 26b of the retained member 26 forms a spherical surface, and encircled by the retainer member 24 as will be discussed later. The retained member 26 is fixed to the retained-member holder 90 by bonding or welding with apart of the retained member entering in the hole 90a of the retained-member holder 90. In particular, the retained member 26 is fixed to the retained-member holder 90 in such a way that a center C of the retained member is located on the rotation axis R. The retained member 26 may be held in a non-fixed manner with the retained-member holder 90.

The cylindrical magnet 32 is bonded and fastened to a cylindrical inner circumference 28f of the hub 28 corresponding to the internal cylindrical face thereof. The cylindrical magnet 32 is formed of, for example, a rare-earth magnetic material or a ferrite magnetic material. In this embodiment, the cylindrical magnet 32 is formed of a neodymium-based rare-earth magnetic material. The cylindrical magnet 32 has 12 driving polarities in the circumferential direction thereof (a tangent line direction of a vertical circle to the rotation axis R and around it). The cylindrical magnet 32 faces nine salient poles of the stator core 40 in the radial direction. An anti-corrosion process, such as electrodeposition coating or spray coating is applied to the surface of the cylindrical magnet 32.

The stator core 40 includes an annular part and the nine salient poles extending therefrom outwardly in the radial direction, and is fixed on an upper-face-4d side of the base 4. The stator core 40 is formed by, for example, laminating six thin magnetic steel sheets each having a thickness of 0.2 mm, and caulking and integrating those sheets together. The stator core 40 may be formed by laminating, for example, 2 to 32 thin magnetic steel sheets each having a thickness of 0.1 to 0.8 mm. An insulation coating is applied to the surface of the stator core 40 by, for example, electrodeposition coating or powder coating. A coil 42 is wound around each salient pole of the stator core 40. When three-phase substantially sinusoidal drive currents are caused to flow through the respective coils 42, drive magnetic fluxes are generated along the salient poles. The stator core 40 may be formed by solidifying magnetic powder materials like an sintered body.

The base 4 includes an annular base protrusion 4e around the rotation axis R of the rotating body. The base protrusion 4e protrudes upwardly so as to encircle the second thrust member 31. When a center hole 40a of the annular part of the stator core 40 is engaged with an outer circumference 4f of the base protrusion 4e, the stator core 40 is fixed to the base 4. In particular, the annular part of the stator core 40 is bonded and fixed to the base protrusion 4e by press-fitting or loose fitting.

The insulation tape 44 or a resin-made insulation sheet like PET is provided at a portion of the upper face 4d of the base 4 corresponding to the salient poles and the coils 42. The attracting plate 46 formed of a magnetic material like iron is provided at a portion of the upper face 4d of the base 4 facing with the cylindrical magnet 32 in the axial direction (a direction parallel to the rotation axis R). The attracting plate 46 is fixed to the base 4 by caulking or bonding. The attracting plate 46 attracts the cylindrical magnet 32 by magnetic force, and thus downward force in the axial direction is applied to the cylindrical magnet 32. Such a force suppresses a floating of the rotating body while the rotating body is rotating.

The base 4 is provided with a non-through-hole type hole 4g around the rotation axis R of the rotating body. The hole 4g may be a through-hole. The retainer member 24 is fitted in and fixed to the hole 4g. The retainer member 24 supports the retained member 26 in a freely rotatably manner via the lubricant 48. Hence, the rotating body is supported in a freely rotatable manner relative to the base 4.

The retainer member 24 is formed in a cup shape with a bottom having a hollow barrel portion 24a and a bottom portion 24b formed integrally with each other, and is fixed to the base 4 by, for example, bonding with the bottom portion 24b placed downwardly. The hollow barrel portion 24a has cylindrical inner circumference 24c. The retained member 26 is retained in the retainer member 24, and the inner circumference 24c encircles a side face 26b of the retained member 26 via a radial gap 53.

The second thrust member 31 is provided so as to encircle the retainer member 24. The second thrust member 31 includes a cylindrical part 31a and a flange part 31b extending inwardly in the radial direction from the lower end of the cylindrical part 31a, and the second thrust member 31 has an L-shaped cross-section. The second thrust member 31 encircles the first thrust member 30, and fixed to an outer circumference 30c of the first thrust member 30. The second thrust member 31 is fixed to the first thrust member 30 by a combination of press-fitting and bonding. A bond between the second thrust member 31 and the first thrust member 30 seals a gap between the second thrust member 31 and the first thrust member 30, and serves as a sealant preventing the lubricant 48 from leaking out.

The flange member 34 is formed in an annular shape, and is provided at the outer-circumference-24d side of the retainer member 24. The flange member 34 is formed integrally with the retainer member 24. The flange member 34 may be a separate piece from the retainer member 24. In this case, the flange member 34 may be formed of a different material from that of the retainer member 24. A lower face 30d of the first thrust member 30, an inner circumference 31c of the cylindrical part 31a, and an upper face 31d of the flange part 31b form an annular recess 60 concaved outwardly in the radial direction. The flange member 34 is retained in this recess 60. An upper face 34a of the flange member 34 and the lower face 30d of the first thrust member 30 face with each other in the axial direction via a first thrust gap 57 in an annular shape. In addition, a lower face 34b of the flange member 34 and the upper face 31d of the flange part 31b face with each other in the axial direction via a second thrust gap 58 in an annular shape.

Formed between the flange part 31b of the second thrust member 31 and the retainer member 24 is a tapered seal 70 where a gap 72 between an inner circumference 31e of the flange part 31b and an outer circumference 24d of the retainer member 24 gradually becomes widespread downwardly, i.e., toward a space where gas like air is present at an outlet side. In view of other aspects, the gap of the tapered seal 70 becomes widespread from a bottom side where the lubricant 48 is present to the outlet side. In particular, both of the inner circumference 31e of the flange part 31b and the outer circumference 24d of the retainer member 24 are formed so as to decrease the diameter toward the bottom, and the diameter decreasing rate of the inner circumference 31e of the flange part 31b is smaller than the diameter decreasing rate of the outer circumference 24d of the retainer member 24, thereby realizing the tapered shape of the tapered seal 70. In addition, the tapered seal 70 has the bottom area formed at a more distant location from the rotation axis R than the outlet area. When the rotating body rotates, outward force in the radial direction due to centrifugal force is applied to the lubricant 48 in the tapered seal 70. Since the tapered seal 70 has the bottom area located outwardly in the radial direction relative to the outlet area, such force acts so as to push the lubricant 48 toward the bottom area. The tapered seal 70 has a gas-liquid interface 86 of the lubricant 48, and serves as a capillary seal that suppresses a leak-out of the lubricant 48 by capillary force.

The cap 12 is formed of a metal like stainless-steel or a resin and in a substantially disk shape. The cap 12 is fixed to an upper face 90b of the retained-member holder 90 so as to block off the upper end of the hole 90a of the retained-member holder 90 by, for example, bonding.

The lubricant 48 is continuously present in a backward area from the gas-liquid interface 86 in the gap between the rotating body and the stationary body. In particular, the lubricant 48 is applied in gaps between the retained member 26, the first thrust member 30, and the second thrust member 31 which are parts of the rotating body, and the retainer member 24 and the flange member 34 which are parts of the stationary body. The lubricant 48 contains a fluorescent material. When light like ultraviolet ray is emitted to the lubricant 48, the lubricant 48 emits, for example, blue or green light with a different wavelength from that of the emitted light because of the behavior of the fluorescent material. Since the lubricant 48 contains such a fluorescent material, it becomes easy to inspect the fluid level of the lubricant 48. In addition, sticking of the lubricant 48 to an improper location and leakage of the lubricant 48 can be easily detected.

The upper face 34a of the flange member 34 includes a first thrust dynamic pressure generating groove formed area 63. The first thrust dynamic pressure generating groove formed area 63 is formed with first thrust dynamic pressure generating grooves 55 in a spiral shape or a herringbone shape. The first thrust dynamic pressure generating grooves 55 may be formed in the lower face 30d of the first thrust member 30 instead of the first thrust dynamic pressure generating groove formed area 63 or in addition thereto.

A lower face 34b of the flange member 34 includes a second thrust dynamic pressure generating groove formed area 64. The second thrust dynamic pressure generating groove formed area 64 is formed with second thrust dynamic pressure generating grooves 56 in a spiral shape or a herringbone shape. The second thrust dynamic pressure generating grooves 56 may be formed in the upper face 31d of the flange part 31b of the second thrust member 31 instead of the second thrust dynamic pressure generating groove formed area 64 or in addition thereto. Still further, a structure having no second thrust dynamic pressure generating groove formed area 64, i.e., having no second thrust dynamic pressure generating grooves 56 can be employed.

The first thrust dynamic pressure generating grooves 55 and the second thrust dynamic pressure generating grooves 56 generate fluid dynamic pressures in the lubricant 48 when the rotating body rotates relative to the stationary body. In particular, the first thrust dynamic pressure generating grooves 55 and the second thrust dynamic pressure generating grooves 56 generate fluid dynamic pressures in a so-called pump-in direction in which the generated synthetic dynamic pressures push the lubricant 48 toward the rotation axis R. The dynamic pressures in the pump-in direction produce floating force in a first thrust gap 57 between the first thrust member 30 and the flange member 34, a second thrust gap 58 between the second thrust member 31 and the flange member 34, and a gap between the retained member 26 and the retainer member 24 in a separating direction from each other.

An inner circumference 24c of the hollow barrel portion 24a includes a radial dynamic pressure generating groove formed area 62. The radial dynamic pressure generating groove formed area 62 is formed with radial dynamic pressure generating grooves 50 in a spiral or herringbone shape. The radial dynamic pressure generating grooves 50 generate fluid dynamic pressure in the lubricant 48 in the radial direction when the rotating body rotates relative to the stationary body. The fluid dynamic pressure in the radial direction acts so as to maintain a radial gap 53 between the retainer member 24 and the retained member 26 to be substantially constant. That is, the retained member 26 is positioned so as to have a center C thereof located on the center axis of the cylindrical inner circumference 24c by the fluid dynamic pressure in the radial direction. The radial dynamic pressure generating grooves 50 may be formed in the retained member 26 instead of the radial dynamic pressure generating groove formed area 62 or in addition thereto.

The first thrust dynamic pressure generating groove formed area 63 is an annular band-like area encircling the rotation axis R, and is formed so as to be substantially orthogonal to the axial direction. That is, the first thrust dynamic pressure generating groove formed area 63 is a disk-like area around the rotation axis R. The first thrust dynamic pressure generating groove formed area 63 is formed in such a way that a difference in radii between the inscribed circle and the circumscribed circle becomes larger than the dimension of the radial dynamic pressure generating groove formed area 62 in the axial direction. According to this structure, in comparison with a case not so, the fluid dynamic pressure generated by the first thrust dynamic pressure generating grooves 55 becomes large, and thus the bearing rigidity of the thrust dynamic bearing is enhanced. When the bearing rigidity of the thrust dynamic bearing is enhanced, even if, for example, off-center load is applied to the rotating body and moment force is applied to the rotating body relative to the rotation axis R, a tilting relative to the rotation axis R can be suppressed. When the rotating device is made thin, the first thrust dynamic pressure generating groove formed area 63 is not decreased, and thus a reduction of the fluid dynamic pressure generated by the first thrust dynamic pressure generating grooves 55 and that of the bearing rigidity can be suppressed. The same is true of the second thrust dynamic pressure generating groove formed area 64.

The rotating body and the stationary body are structured in such a way that a weight center G of the rotating body is located at the center C of the retained member 26 when the magnetic recording disk 8 is mounted on the hub 28.

An explanation will be given of an operation of the rotating device 100 employing the above-explained structure. Three-phase drive currents are applied to the coils 42 to rotate the magnetic recording disk 8. When such drive currents flow through the respective coils 42, magnetic fluxes are generated along the nine salient poles. Those magnetic fluxes apply torque to the cylindrical magnet 32, and thus the hub 28 and the magnetic recording disk 8 engaged therewith rotate. While at the same time, when the voice coil motor 16 causes the swing arm 14 to swing, the recording/playing head goes out and comes in the swingable range over the magnetic recording disk 8. The recording/playing head converts magnetic data recorded in the magnetic recording disk 8 into electrical signals, and transmits the signals to a control board (unillustrated), or writes data transmitted in the form of electrical signals from the control board in the magnetic recording disk 8 as magnetic data.

According to the rotating device 100 of this embodiment, the retained member 26 is formed in a spherical shape. According to the experiences of the inventors as persons skilled in the art, for example, a spherical member formed of a ferrous material can relatively easily accomplish a high form accuracy. Hence, according to the rotating device 100 utilizing the spherical retained member 26, when the rotating device 100 is made thin, a reduction of the rotation precision can be suppressed. In addition, the costs of the rotating device 100 can be reduced.

In addition, according to the rotating device 100 of this embodiment, the fluid dynamic pressure generated by the first thrust dynamic pressure generating grooves 55 is relatively large. Hence, it is sufficient for the radial dynamic pressure generating grooves 50 if the radial dynamic pressure generating grooves 50 mainly accomplishes a centering. Therefore, the number of radial dynamic pressure generating groove formed areas 62 can be one, and the dimension thereof in the axial direction can be made relatively small. As a result, the dimension of the rotating device 100 in the axial direction can be made relatively small. For example, the dimension of the rotating device 100 in the axial direction can be equal to or smaller than 4.1 mm.

Second Embodiment

The major difference between a rotating device of a second embodiment and the rotating device 100 of the first embodiment is the shape of the retainer member.

Figure 3:
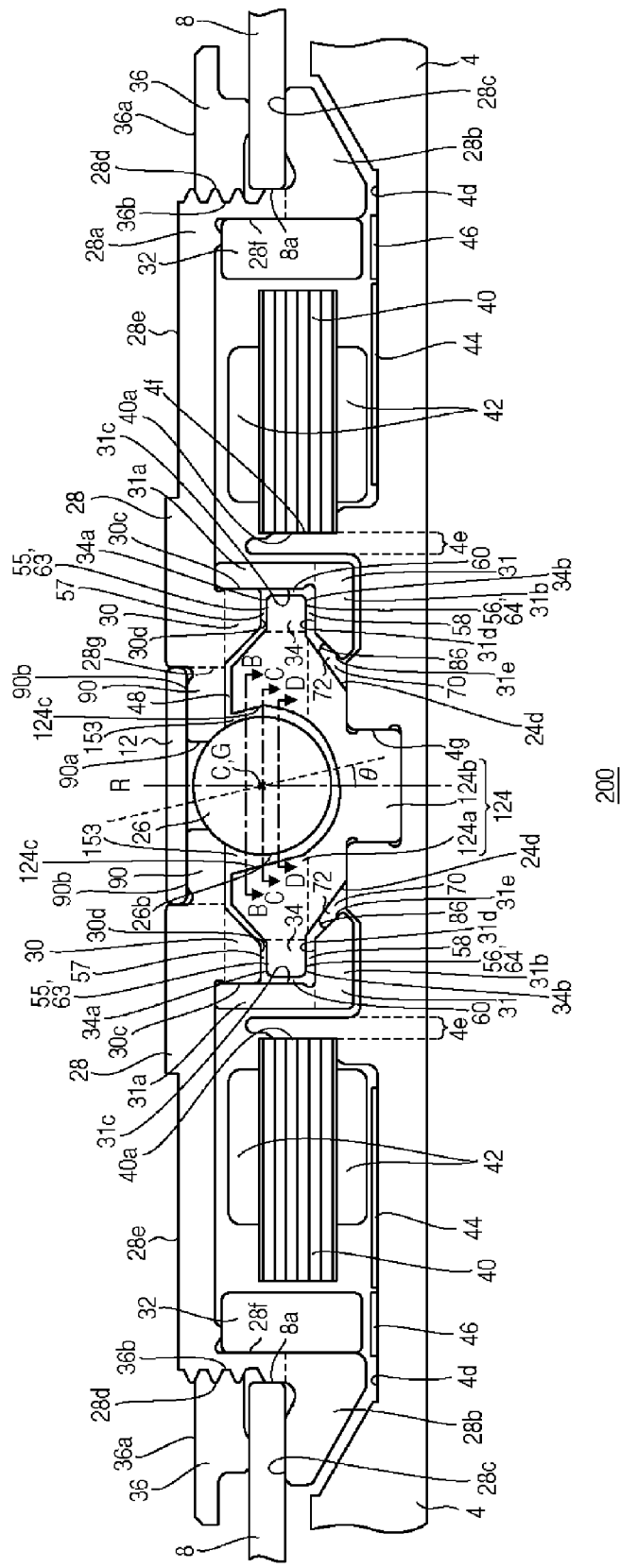
FIG. 3 is a cross-sectional view illustrating a rotating device according to a second embodiment.

FIG. 3 is a cross-sectional view illustrating a rotating device 200 of the second embodiment. FIG. 3 corresponds to FIG. 2. The rotating body includes the hub 28, the retained member 26, the retained-member holder 90, the first thrust member 30, the second thrust member 31, the clamper 36, the cylindrical magnet 32, and the cap 12. The stationary body includes the base 4, a retainer member 124, the flange member 34, the stator core 40, the coils 42, the insulation tape 44, and the attracting plate 46.

The retainer member 124 is formed in a cup shape with a bottom in such a way that a hollow barrel portion 124a is formed integral with the bottom 24b. The hollow barrel portion 124a has a cylindrical inner circumference 124c. In particular, the inner circumference 124c is formed in a cylindrical shape having a center axis tilted by an angle θ relative to the rotation axis R. The retained member 26 is retained in the retainer member 124, and the inner circumference 124c encircles the side face 26b via a radial gap 153. When the rotating body is still, the inner circumference 124c and the side 26b of the retained member 26 at least partially contact with each other.

Figure 4A:
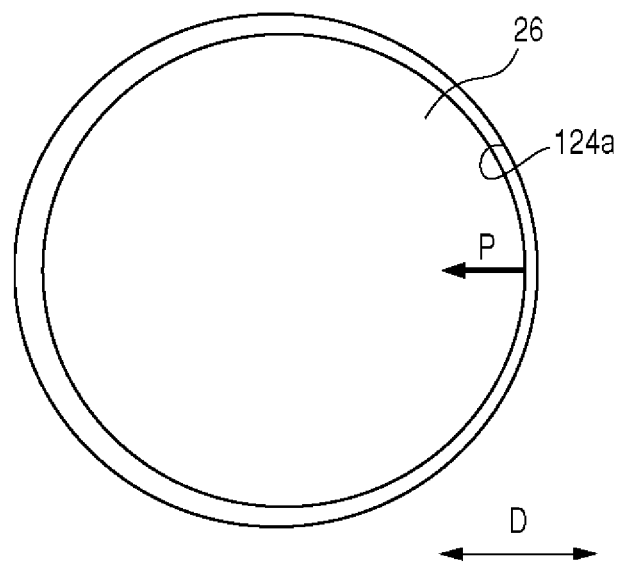
FIG. 4A is a cross-sectional view taken along a line B-B in FIG. 3.
Figure 4B:
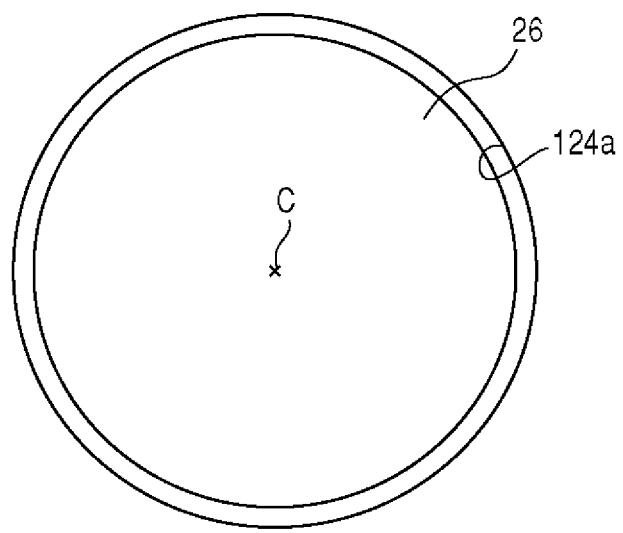
FIG. 4B is a cross-sectional view taken along a line C-C in FIG. 3.
Figure 4C:
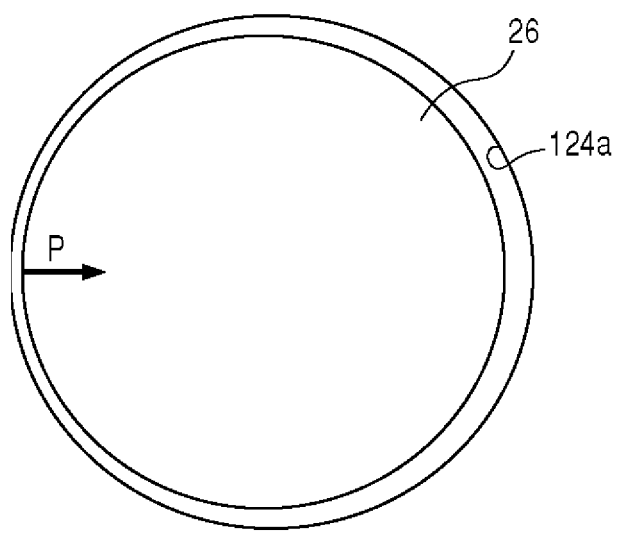
FIG. 4C is a cross-sectional view taken along a line D-D in FIG. 3.

FIG. 4A is a cross-sectional view taken along a line B-B in FIG. 3, FIG. 4B is a cross-sectional view taken along a line C-C in FIG. 3, and FIG. 4C is a cross-sectional view taken along a line D-D in FIG. 3. As is clear from FIGS. 4A to 4C, the retained member 26 is decenterized in opposite directions with the cut plane in FIG. 4A and the cut plane in FIG. 4C relative to the inner circumference 124c of the retainer member 124. Hence, dynamic pressure becomes relatively large at the respective narrowed gaps, and thus respective synthesis dynamic pressures in the B-B cross-sectional view and the D-D cross-sectional view are generated at the positions indicated by the alphabet P. That is, in the cases of the cut plane in FIG. 4A and the cut plane in FIG. 4C, synthesis dynamic pressures P in opposite directions are generated. The smaller the gap is, the larger the dynamic pressure P becomes, and the larger the gap is, the smaller the dynamic pressure P becomes. Hence, a balancing is accomplished with a gap condition in which the two dynamic pressures P are substantially equal, and thus an autonomous centering mechanism which makes the gap 153 between the retainer member 124 and the retained member 26 substantially uniform is accomplished. That is, the retained member 26 is positioned so as to have the center C thereof located on the center axis of the cylindrical inner circumference 124c by the fluid dynamic pressure in the radial direction.

Since the B-B cross-sectional view and the D-D cross-sectional view are offset in the axial direction, the dynamic pressure P in the B-B cross-sectional view has downward component force, while the dynamic pressure P in the D-D cross-sectional view has upward component force. Such upward component force and downward component force act on the retained member 26 so as to suppress a displacement in the axial direction. As a result, the retained member 26 is supported by the dynamic pressure P in the radial direction and the axial direction, thereby accomplishing a further stable rotation.

According to the rotating device 200 of this embodiment, the same advantageous effects as those of the rotating device 100 of the first embodiment can be accomplished.

Third Embodiment

The major differences between a rotating device of a third embodiment and the rotating device 100 of the first embodiment are the shape of the base and that of the second thrust member.

Figure 5:
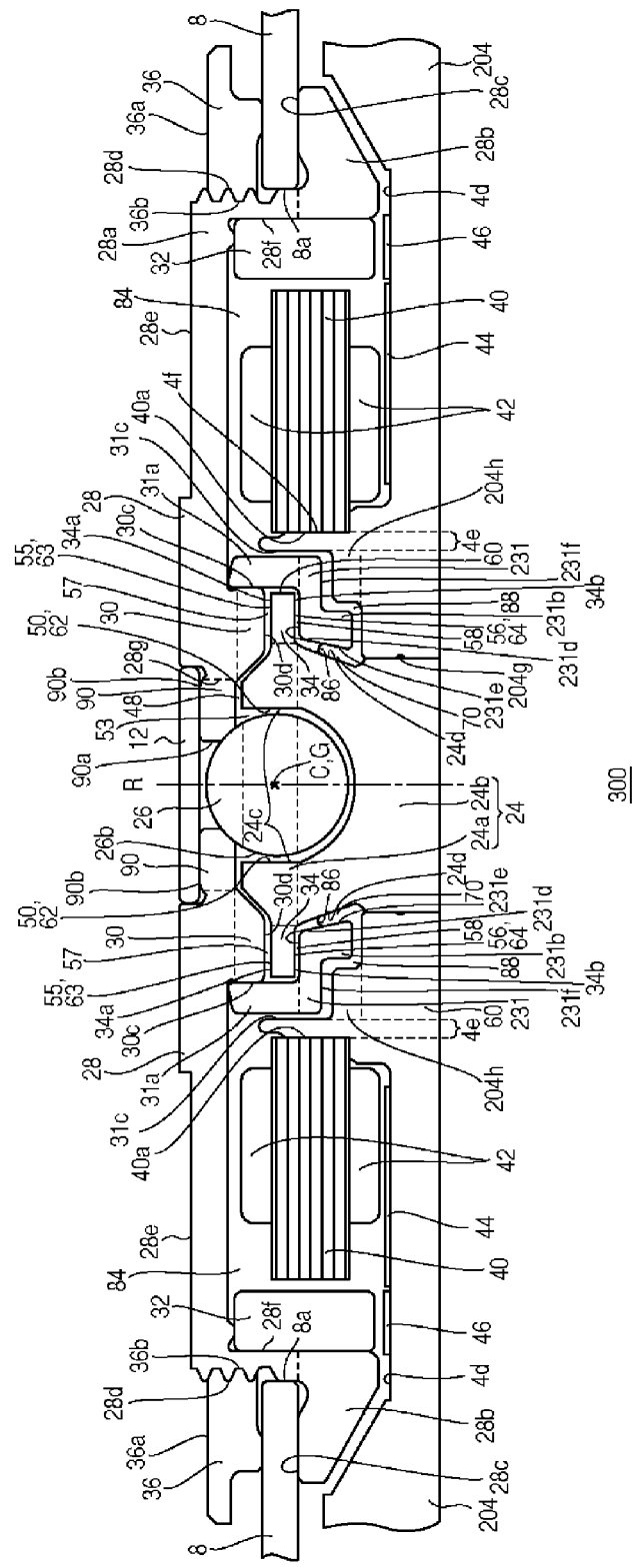
FIG. 5 is a cross-sectional view illustrating a rotating device according to a third embodiment.

FIG. 5 is a cross-sectional view illustrating a rotating device 300 of the third embodiment. FIG. 5 corresponds to FIG. 2. The rotating body includes the hub 28, the retained member 26, the retained-member holder 90, the first thrust member 30, a second thrust member 231, the clamper 36, the cylindrical magnet 32, and the cap 12. The stationary body includes a base 204, the retainer member 24, the flange member 34, the stator core 40, the coils 42, the insulation tape 44, and the attracting plate 46.

The second thrust member 231 includes the cylindrical part 31a and a flange part 231b extending inwardly in the radial direction from the lower end of the cylindrical part 31a. The flange part 231b is, unlike the flange part 31b of the first embodiment, formed with an annular thrust recess 231f concaved upwardly in the direction of the rotation axis R from the outer edge of the lower end of the flange part 231b.

The base 204 is provided with a through-hole 204g around the rotation axis R of the rotating body. The retainer member 24 is fitted in and fixed to the through-hole 204g. In addition, the base 204 includes an entering part 204h entering in the thrust recess 231f.

A gap 88 between the second thrust member 31 and the base 204 is in communication with a motor internal space 84 held between the hub 28 and the base 204, and the gas side of the gas-liquid interface 86. That is, the gap 88 causes the gas-liquid interface 86 to be in communication with the motor internal space 84. As explained above, since the flange part 231b has the thrust recess 231f, and the base 204 has the entering part 204h entering the thrust recess 231f, the gap 88 is made so as to have a narrow width but a long length. In addition, the gap 88 is provided with multiple bent portions. Hence, the channel resistance of the gap 88 can be increased.

According to the rotating device 300 of this embodiment, the same advantageous effects as those of the rotating device 100 of the first embodiment can be accomplished. In addition, according to the rotating device 300 of this embodiment, the gap 88 between the second thrust member 31 and the base 204 has a narrowed width but a long length. In addition, the gap 88 is provided with multiple bent portions. Therefore, the channel resistance of the gap 88 can be increased. Accordingly, the gap 88 serves as a labyrinth to the lubricant 48 vaporized from the gas-liquid interface 86 of the tapered seal 70, thereby reducing the quantity of the dissipated lubricant 48.

Fourth Embodiment

The major differences of a rotating device of a fourth embodiment from the rotating device 100 of the first embodiment are the shape of the retained member and that of the retainer member.

Figure 6:
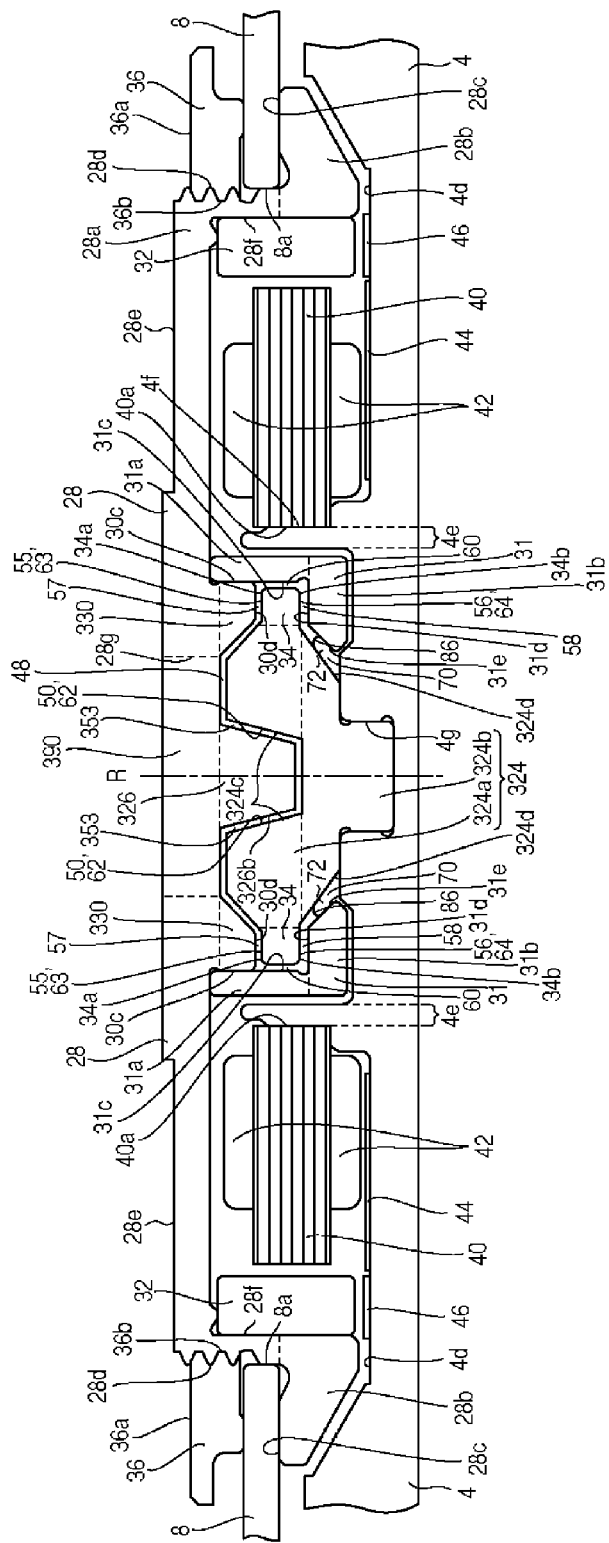
FIG. 6 is a cross-sectional view illustrating a rotating device according to a fourth embodiment.

FIG. 6 is a cross-sectional view illustrating a rotating device 400 of the fourth embodiment. FIG. 6 corresponds to FIG. 2. The rotating body includes the hub 28, a retained member 326, a retained-member holder 390, a first thrust member 330, the second thrust member 31, the clamper 36, and the cylindrical magnet 32. The stationary body includes the base 4, the retainer member 324, the flange member 34, the stator core 40, the coils 42, the insulation tape 44, and the attracting plate 46.

Provided at an inner-circumference-28g side of the hub protrusion 28a is the retained-member holder 390. Unlike the retained-member holder 90 of the first embodiment, the retained-member holder 390 is formed in a disk shape.

The retained member 326 is formed of a metal, such as a ferrous material like SUS 430 or SUS 303, or a copper alloy. The retained member 326 is formed in a truncated cone shape, and is fixed to the retained-member holder 390 so as to align the center axis of the truncated cone with the rotation axis R. Hence, a side face 326b of the retained member 326 is formed in a truncated cone shape. The retained member 326 may be formed integrally with the first thrust member 330.

The retainer member 324 is formed in a cup shape with a bottom in such a way that a hollow barrel portion 324a and a bottom 324b are formed integrally, and is fixed to the base 4 by, for example, bonding with the bottom 324b directed downwardly. The hollow barrel 324a has an inner circumference 324c formed in a truncated cone shape. The retained member 326 is retained in the retainer member 324, and the inner circumference 324c encircles the side face 326b of the retained member 326 with a radial gap 353.

According to the rotating device 400 of this embodiment, the same advantageous effects as those of the rotating device 100 of the first embodiment can be accomplished.

Fifth Embodiment

In the first to fourth embodiments, the explanation was given of an example case in which the retained member is fixed to the rotating body. In a fifth embodiment, however, an explanation will be given of an example case in which the retained member is fixed to the stationary body.

Figure 7:
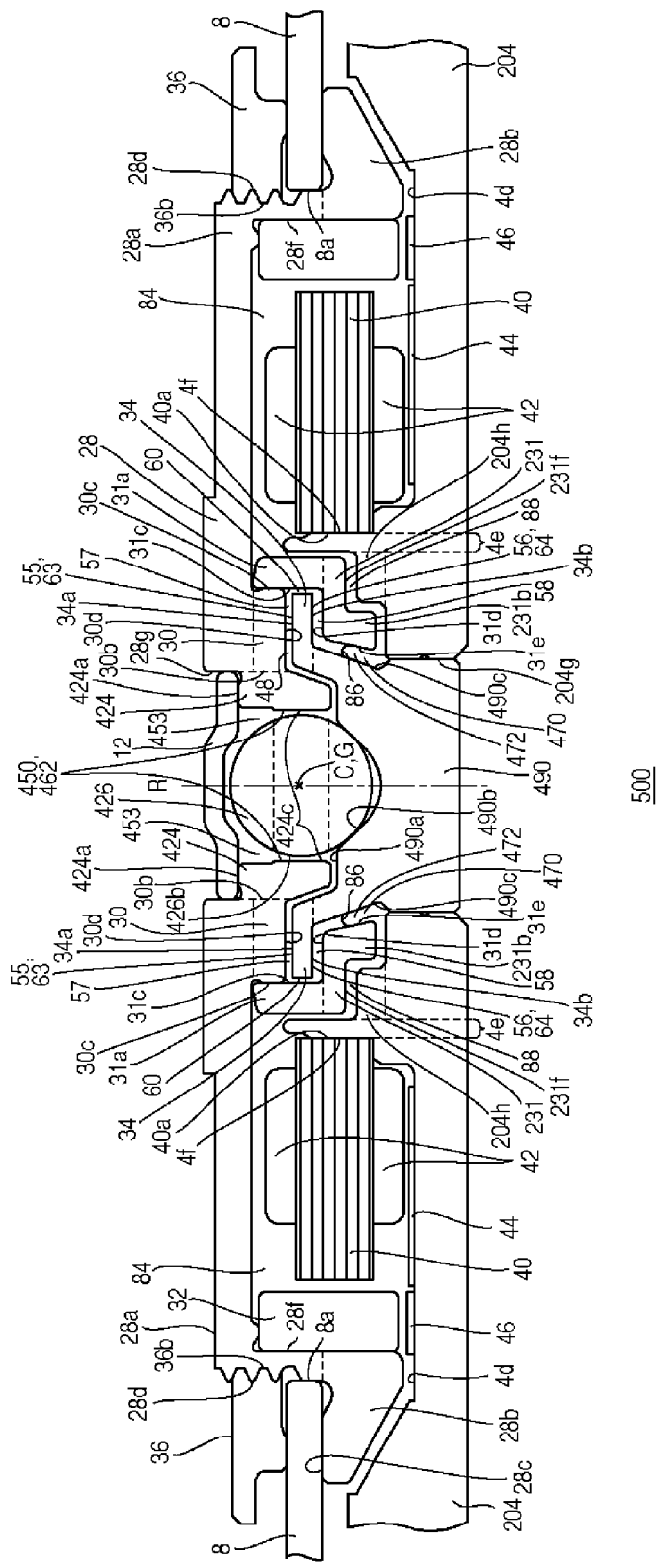
FIG. 7 is a cross-sectional view illustrating a rotating device according to a fifth embodiment.

FIG. 7 is a cross-sectional view illustrating a rotating device 500 of the fifth embodiment. FIG. 7 corresponds to FIG. 5. The rotating body includes the hub 28, a retainer member 424, the first thrust member 30, the second thrust member 231, the clamper 36, the cylindrical magnet 32, and the cap 12. The stationary body includes the base 204, a retained-member holder 490, the flange member 34, a retained member 426, the stator core 40, the coils 42, the insulation tape 44, and the attracting plate 46.

The retained-member holder 490 is formed in a substantially cylindrical shape, and is formed of a metal, such as a ferrous material like SUS 430 or SUS 303 or a copper alloy. The retained-member holder 490 is fitted in and fixed to a through-hole 204g of the base 204. A holding recess 490b is formed in an upper face 490a of the retained-member holder 490. The retained-member holder 490 is fixed with the flange member 34. In particular, the flange member 34 is fixed to the retained-member holder 490 so as to encircle the retainer member 424.

The retained member 426 is formed of a ferrous material like SUJ2 or a ceramic. The retained member 426 is formed in a spherical shape, and is fixed to the retained-member holder 490 by bonding or welding with a part of the retained member 426 entering in the holding recess 490b. In particular, the retained member 426 is fixed to the retained-member holder 490 so as to position a center C of the retained member 426 on the rotation axis R.

The retainer member 424 is joined with the circumference of a hole 30b of the first thrust member 30. The retainer member 424 is formed in a cylindrical shape, and is formed of a ferrous material like SUS 430 or SUS 303, or a copper alloy. The retained member 426 is retained in the retainer member 424. An inner circumference 424c of the retainer member 424 is formed in a cylindrical shape, and encircles a side face 426b of the retained member 426 with a radial gap 453. The retainer member 424 may be formed integrally with the first thrust member 30.

Formed between a flange part 231b of the second thrust member 231 and the retained-member holder 490 is a tapered seal 470 where a gap 472 between an inner circumference 31e of the flange part 231b and an outer circumference 490c of the retained-member holder 490 gradually becomes widespread downwardly. The tapered seal 470 corresponds to the tapered seal 70 of the third embodiment.

The cap 12 is fixed to an upper face 424a of the retainer member 424 by, for example, bonding so as to block off the upper space of the retainer member 424.

The lubricant 48 is applied in a gap between a part of the rotating body that is the retainer member 424, the first thrust member 30, the cap 12, and the second thrust member 231, and, a part of the stationary body that is the retained member 426 and the retained-member holder 490.

The inner circumference 424c of the retainer member 424 includes a radial dynamic pressure generating groove formed area 462. The radial dynamic pressure generating groove formed area 462 is formed with radial dynamic pressure generating grooves 450 in a spiral or herringbone shape. The radial dynamic pressure generating groove formed area 462 and the radial dynamic pressure generating grooves 450 correspond to the radial dynamic pressure generating groove formed area 62 and the radial dynamic pressure generating groove 50 of the third embodiment.

According to the rotating device 500 of this embodiment, the same advantageous effects as those of the rotating device 300 of the third embodiment can be accomplished.

Sixth Embodiment

The major differences of a rotating device according to a sixth embodiment from the rotating device 500 of the fifth embodiment are the shape of the retained member and that of the retainer member.

Figure 8:
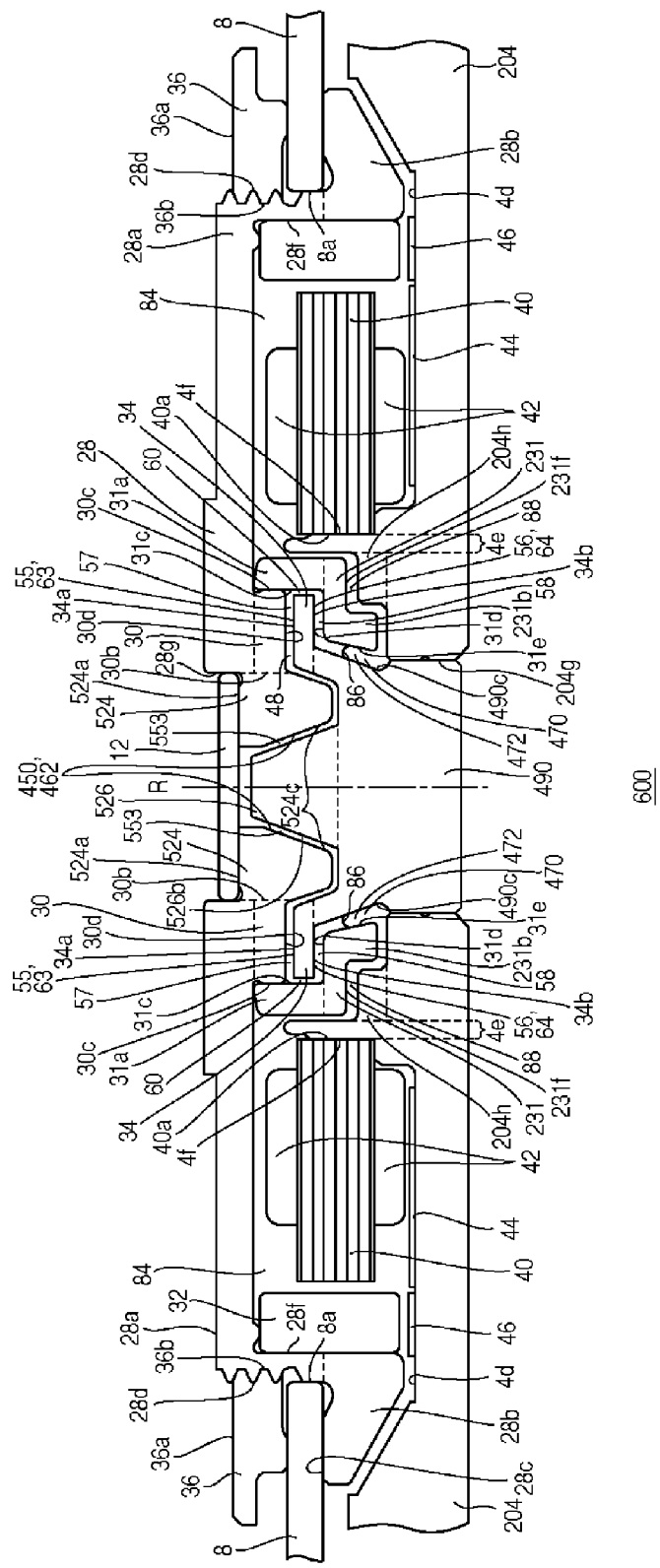
FIG. 8 is a cross-sectional view illustrating a rotating device according to a sixth embodiment.

FIG. 8 is a cross-sectional view illustrating a rotating device 600 of the sixth embodiment. FIG. 8 corresponds to FIG. 7. The rotating body includes the hub 28, a retainer member 524, the first thrust member 30, the second thrust member 231, the clamper 36, the cylindrical magnet 32, and the cap 12. The stationary body includes the base 204, the retained-member holder 490, the flange member 34, a retained member 526, the stator core 40, the coils 42, the insulation tape 44, and the attracting plate 46.

The retained member 526 is formed of a metal material, such as a ferrous material like SUS 430 or SUS 303 or a copper alloy. The retained member 526 is formed in a truncated cone shape, and is fixed to the first thrust member 30 so as to position the center axis of the retained member 526 on the rotation axis R. Hence, a side face 526b of the retained member 526 is formed in a truncated cone shape. The retained member 526 may be formed integrally with the retained-member holder 490.

The retainer member 524 is formed in a cylindrical shape. The retained member 526 is retained in the retainer member 524, and an inner circumference 524c encircles the side face 526b of the retained member 526 with a radial gap 553. The inner circumference 524c includes a tapered face decreasing the diameter toward the bottom. When the rotating body stands still, the inner circumference 524c and the side face 526b of the retained member 526 at least partially contact with each other.

According to the rotating device 600 of this embodiment, the same advantageous effects as those of the rotating device 500 of the fifth embodiment can be accomplished.

Seventh Embodiment

Figure 10:
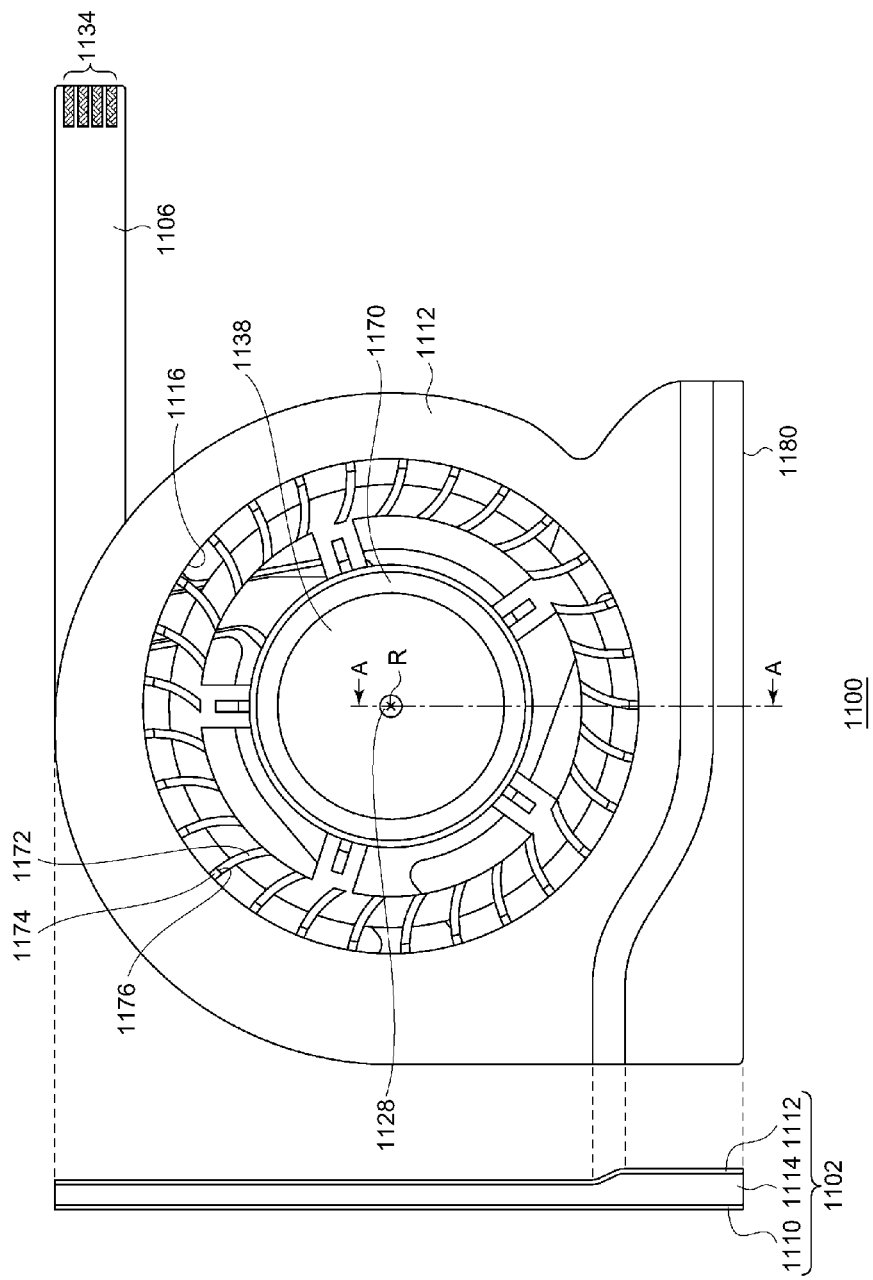
FIG. 10 is a diagram illustrating a top of a fan motor and a side thereof according to an embodiment.
Figure 11:
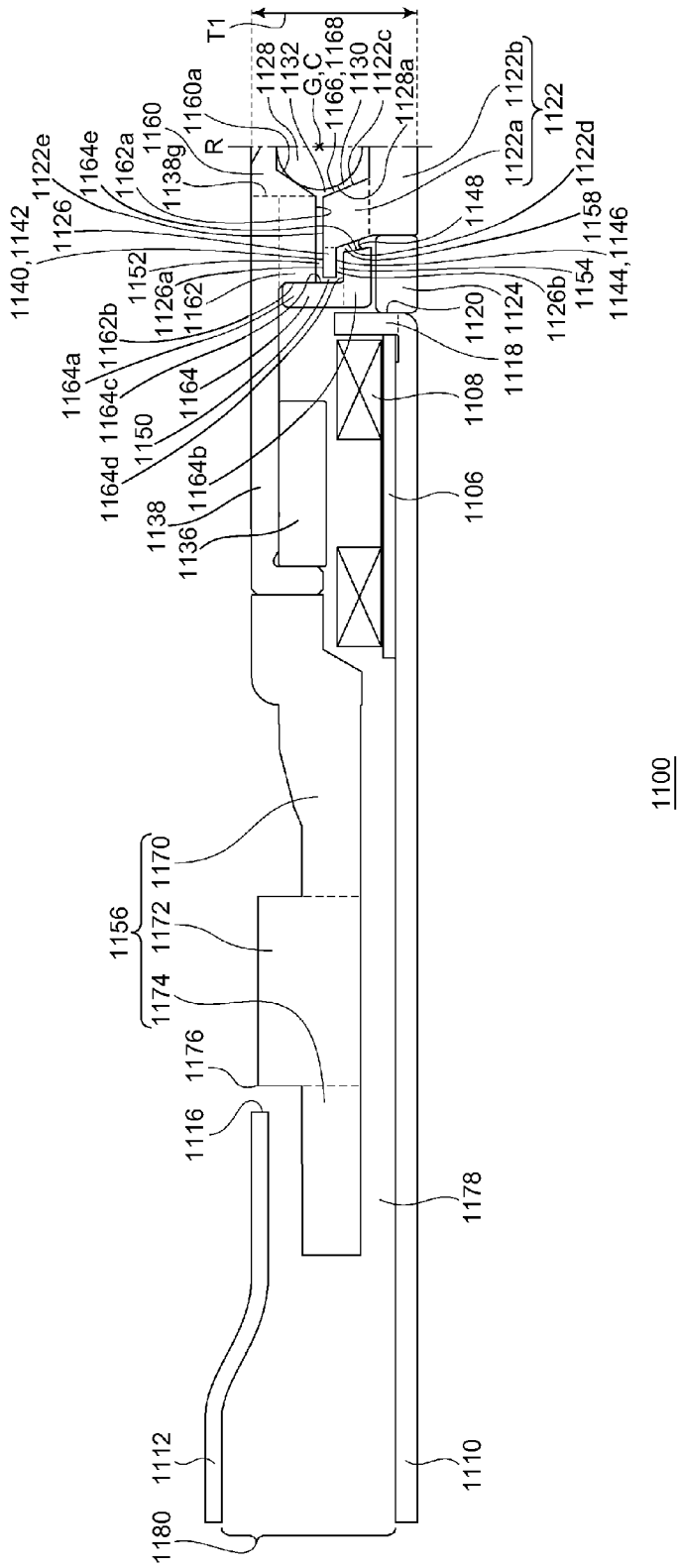
FIG. 11 is a cross-sectional view taken along a line A-A in FIG. 10.

A rotating device 1100 according to a seventh embodiment is in the form of a fan motor. FIG. 10 illustrates the top view of the rotating device 1100 and the side view thereof, and FIG. 11 is a cross-sectional view of FIG. 10. The rotating device 1100 includes a rotating body that creates winds upon rotation. The rotating body of the rotating device 1100 may include a hub 1138 fixed with an impeller 1156. The impeller 1156 may include an annular part 1170 encircling the hub 1138 and fixed to the hub 1138, multiple internal vanes 1172 extending outwardly in the radial direction from the annular part 1170, and an external vane 1174 further extending outwardly in the radial direction from an external end of at least one internal vane 1172 in the radial direction. The rotating device 1100 may have the stationary body with a thickness of equal to or smaller than 3.2 mm in the direction of the rotation axis R.

The rotating device 1100 of the seventh embodiment may include the bearing mechanism of the rotating devices of the first to sixth embodiments. In this case, according to the rotating device 1100 of the seventh embodiment, the same advantageous effects as those of the bearing mechanisms of the rotating devices of the first to sixth embodiments can be accomplished.

The structures of the rotating devices according to the embodiments and the operations thereof are explained above. Those embodiments are merely examples, and it should be understood by those skilled in the art that a combination of respective structural components permits various modifications, and such modifications are within the scope of the present disclosure.

In the first to fifth embodiments, the explanation was given of an example case in which the number of salient poles of the stator core 40 is nine, but the present disclosure is not limited to this case. For example, the number of salient poles of the stator core 40 may be an integral multiple of 3 between 6 and 36. This is merely an example, and the number of salient poles is not limited to this range.

In the first to fifth embodiments, the explanation was given of an example case in which the cylindrical magnet 32 is given with 12 driving polarities, but the present disclosure is not limited to this case. For example, an even number of driving polarities between 8 and 16 may be given to the cylindrical magnet 32. This is merely an example, and the number of driving polarities is not limited to this range.

Figure 9:
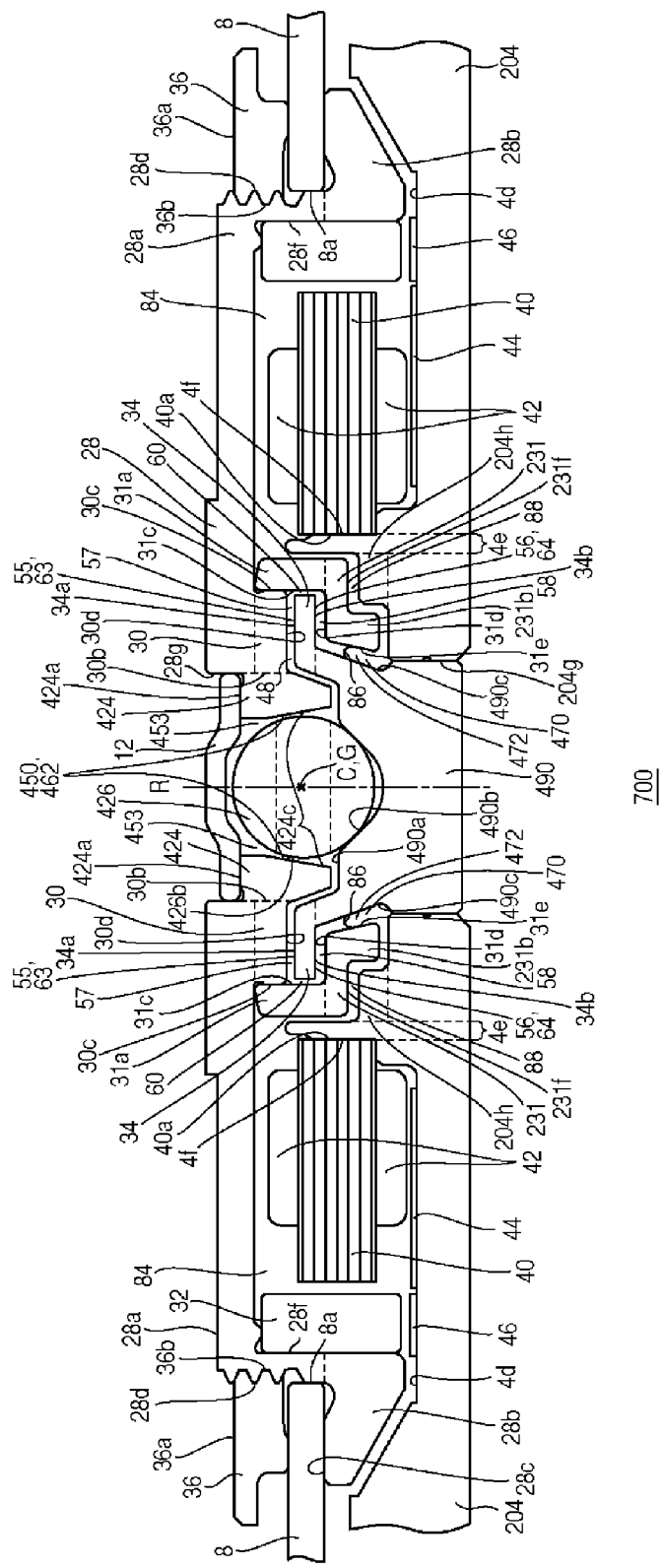
FIG. 9 is a cross-sectional view illustrating a rotating device according to a modified example.

In the fifth embodiment, the explanation was given of an example case in which the inner circumference 424c of the retainer member 424 is in a cylindrical shape, but the present disclosure is not limited to this case. The inner circumference 424c can be formed in various shapes. FIG. 9 is a cross-sectional view illustrating a rotating device 700 according to a modified example. FIG. 9 corresponds to FIG. 7. In this modified example, the inner circumference 424c includes a tapered face decreasing the diameter toward the bottom. When the rotating body stands still, the inner circumference 424c and the side face 426b of the retained member 426 contact with each other.

What is claimed is:

1. A rotating device comprising:
a retained assembly including a spherical retained member with a spherical encircled face, and a first encircling member that includes an annular end face which encircles the spherical retained member and which extends outwardly in a radial direction;
a retainer assembly including a retainer member which includes an encircling face encircling the encircled face and which retains thereinside a part of the spherical retained member, and a facing member that faces the first encircling member in an axial direction, the retainer assembly supporting the retained assembly in a freely and relatively rotatable manner, and forming a fluid dynamic bearing mechanism; and
a first thrust dynamic pressure generating groove formed in at least either one of a surface of the first encircling member and a surface of the facing member, which surfaces face with each other in the axial direction.

2. The rotating device according to claim 1, wherein the spherical retained member includes a part overlapping an area of the first encircling member in the axial direction.

3. The rotating device according to claim 1, further comprising a rotating body which is supported by the fluid dynamic bearing mechanism and which includes a mount portion on which a recording disk is to be mounted, wherein the fluid dynamic bearing mechanism positions a weight center of the rotating body when the recording disk is mounted thereon at a substantial center of the spherical retained member in the axial direction.

4. The rotating device according to claim 1, wherein the retainer member includes a radial dynamic pressure generating groove.

5. The rotating device according to claim 4, wherein a radial difference between an inscribed circle of an area where the first thrust dynamic pressure generating groove is formed and a circumscribed circle thereof is larger than a distance of an area where the radial dynamic pressure generating groove is formed in the axial direction.

6. The rotating device according to claim 1, wherein the encircling face includes a tapered face contacting the encircled face when the rotating device is not rotated.

7. The rotating device according to claim 1, wherein the encircling face includes an annular portion with a center axis inclined relative to a rotation axis of the fluid dynamic bearing mechanism.

8. The rotating device according to claim 1, wherein the facing member is formed integrally with the retainer member.

9. The rotating device according to claim 1, further comprising a second encircling member which is supported by the retained assembly in a fixed manner,
wherein a second thrust dynamic pressure generating groove is formed in at least either one of a surface of the second encircling member and a surface of the facing member, which surfaces face with each other in the axial direction.

10. The rotating device according to claim 1, further comprising a tapered seal located at a position overlapping an area of the spherical retained member in the axial direction.

11. The rotating device according to claim 1, wherein the fluid dynamic bearing mechanism has a dimension in the axial direction on a line passing through a center of the spherical retained member which is equal to or smaller than 4.1 mm.

12. The rotating device according to claim 1, further comprising a rotating body which is supported by the fluid dynamic bearing mechanism and which includes an engaged portion to be engaged with a center hole of the recording disk,
wherein the spherical retained member includes a portion overlapping an area of the engaged portion in the axial direction.

13. The rotating device according to claim 1, further comprising a rotating body which is supported by the fluid dynamic bearing mechanism and which includes an annular magnet,
wherein the spherical retained member includes a portion overlapping an area of the magnet in the axial direction.

14. A rotating device comprising:
a retained assembly including a retained member in a truncated cone shape having a tapered encircled face, and a first encircling member that includes an annular end face which encircles the truncated conical retained member and which extends outwardly in a radial direction;
a retainer assembly including a retainer member which includes an encircling face encircling the encircled face and which retains thereinside a part of the truncated conical retained member, and a facing member that faces the first encircling member in an axial direction, the retainer assembly supporting the retained assembly in a freely and relatively rotatable manner, and forming a fluid dynamic bearing mechanism; and
a first thrust dynamic pressure generating groove formed in at least either one of a surface of the first encircling member and a surface of the facing member, which surfaces face with each other in the axial direction.

15. The rotating device according to claim 14, wherein the retainer member includes a radial dynamic pressure generating groove.

16. The rotating device according to claim 15, wherein a radial difference between an inscribed circle of an area where the first thrust dynamic pressure generating groove is formed and a circumscribed circle thereof is larger than a distance of an area where the radial dynamic pressure generating groove is formed in the axial direction.

17. The rotating device according to claim 14, wherein the facing member is formed integrally with the retainer member.

18. The rotating device according to claim 14, further comprising a second encircling member which is supported by the retained assembly in a fixed manner,
wherein a second thrust dynamic pressure generating groove is formed in at least either one of a surface of the second encircling member and a surface of the facing member, which surfaces face with each other in the axial direction.

19. The rotating device according to claim 14, further comprising a rotating body which is supported by the fluid dynamic bearing mechanism and which includes an annular magnet,
wherein the truncated conical retained member includes a portion overlapping an area of the magnet in the axial direction.

20. A rotating device comprising:
a retained assembly including a retained member that has a spherical or tapered encircled face, and an encircling member that includes an annular end face which encircles the retained member and which extends outwardly in a radial direction;
a retainer assembly including a retainer member which includes an encircling face encircling the encircled face and which retains thereinside a part of the retained member, and a facing member that faces the encircling member in an axial direction, the retainer assembly supporting the retained assembly in a freely and relatively rotatable manner, and forming a fluid dynamic bearing mechanism;
a thrust dynamic pressure generating groove formed in at least either one of a surface of the encircling member and a surface of the facing member, which surfaces face with each other in the axial direction;
a rotating body which is supported by the fluid dynamic bearing mechanism and which is fixed with a vane that creates wind when rotated; and
a drive mechanism that rotates the rotating body.

* * * * *